Jan. 22, 1929.
J. A. DAVEY ET AL
1,700,030
TREATING TREES
Filed March 16, 1925    3 Sheets-Sheet 2
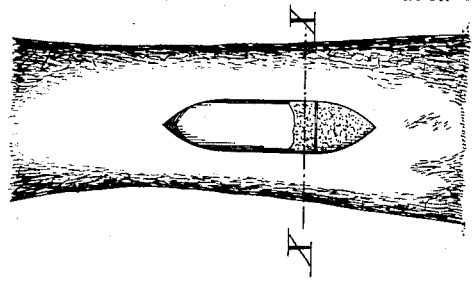
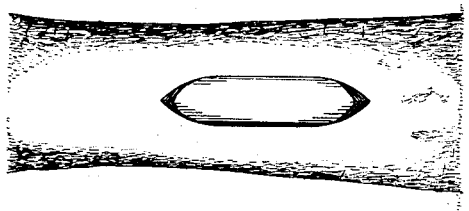
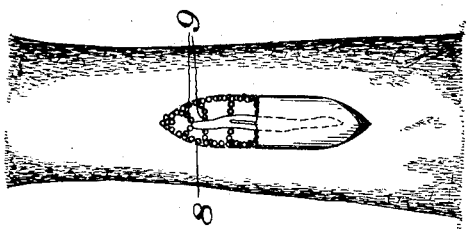
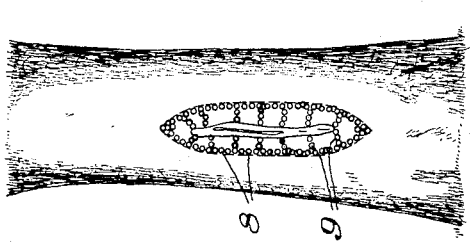
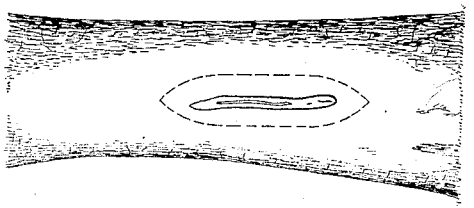
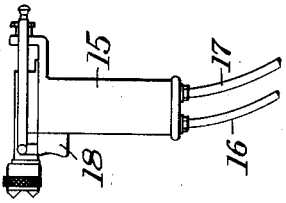
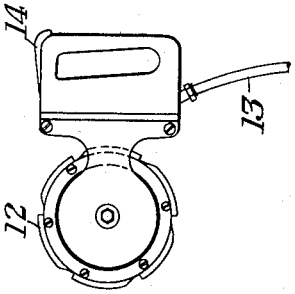
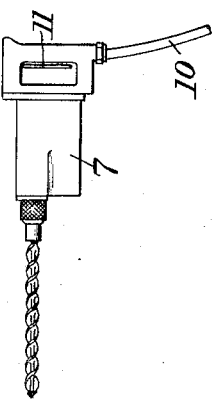
INVENTORS

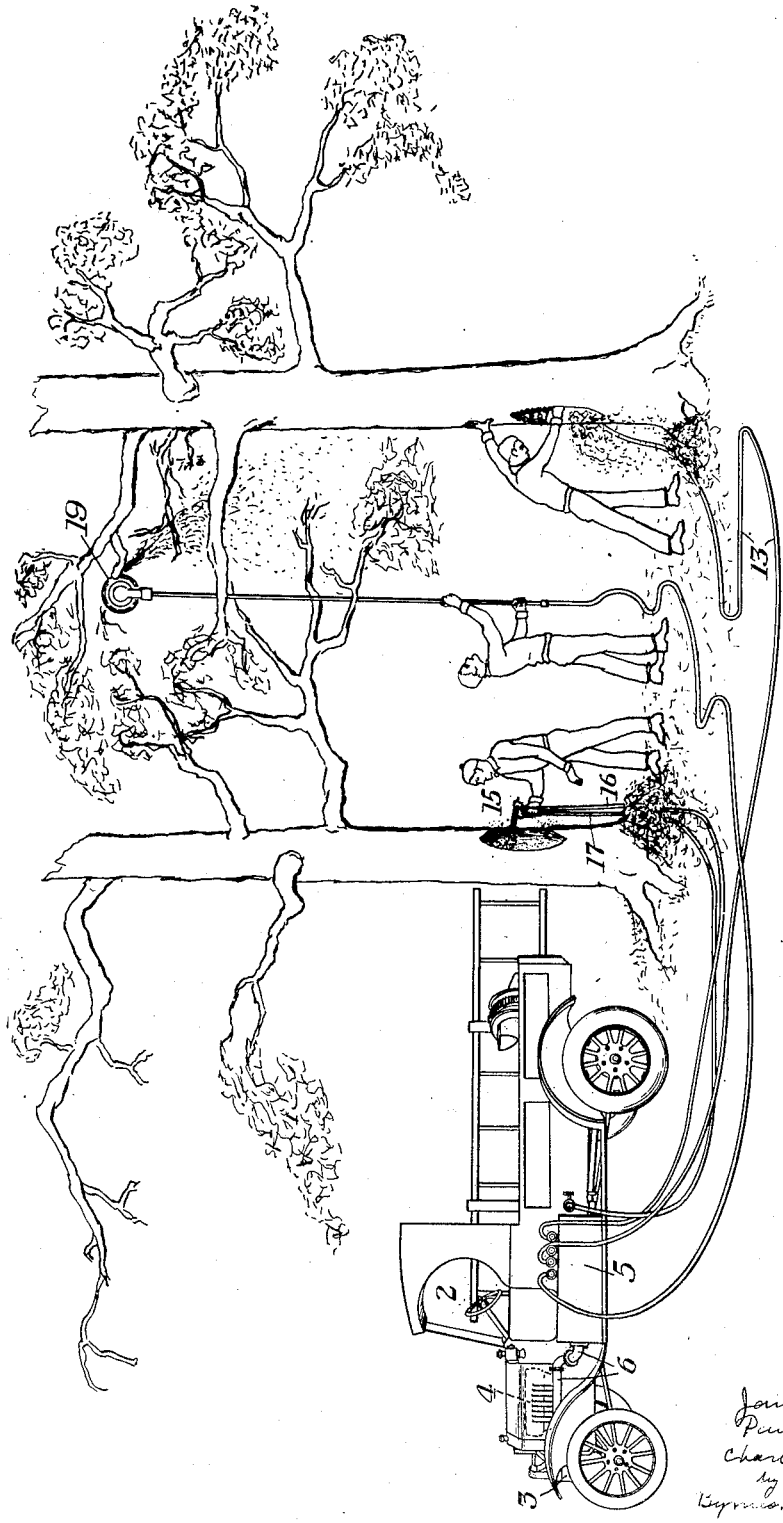

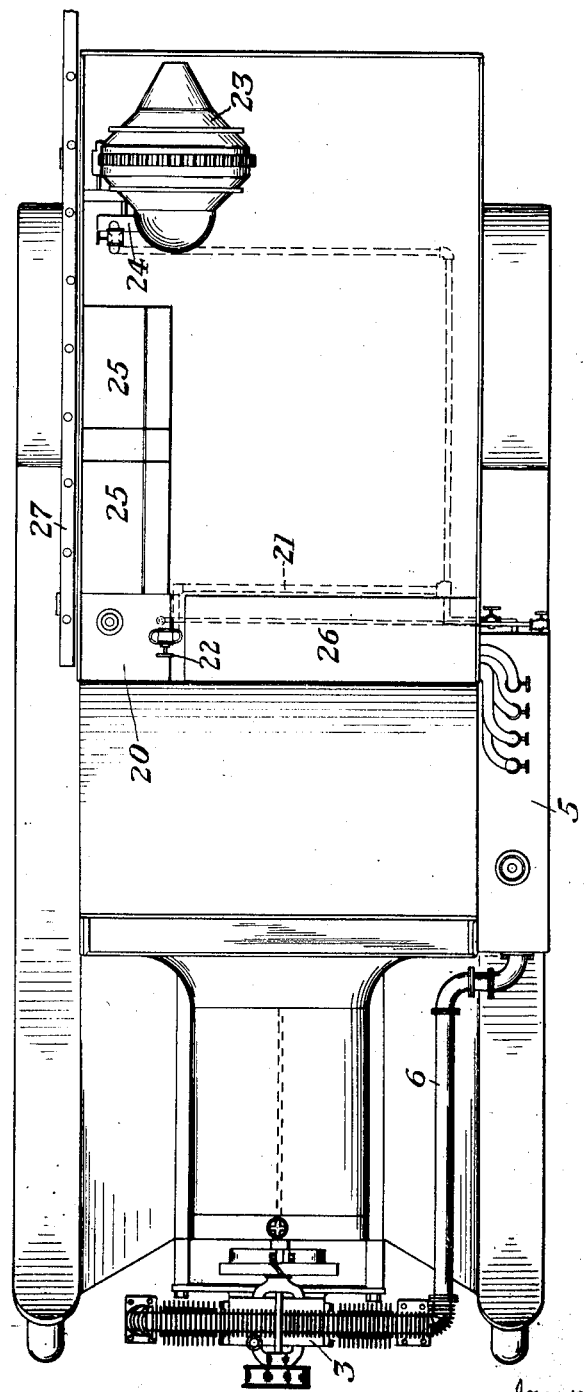

Patented Jan. 22, 1929.

1,700,030

UNITED STATES PATENT OFFICE.

JAMES ABRAM DAVEY, OF SOUND BEACH, CONNECTICUT, AND PAUL H. DAVEY AND CHARLES L. GAUGLER, OF KENT, OHIO; SAID GAUGLER ASSIGNOR OF HIS ENTIRE RIGHT TO THE DAVEY TREE EXPERT COMPANY, OF KENT, OHIO, A CORPORATION OF OHIO.

TREATING TREES.

Application filed March 16, 1925. Serial No. 15,715.

This invention relates to the treating of trees, and is particularly directed toward a method whereby a very large portion of the manual labor heretofore necessary in tree treatment is entirely eliminated so that the work may be done at a great reduction in cost and more satisfactorily.

We provide for compressing air adjacent the tree, feeding compressed air through a flexible conduit to an air operated motor and tool, and manually directing the tool to work on the tree. Tree surgery as heretofore carried out has been largely a matter of hand work. The excavation of the cavities, the trimming of the branches and the like has all been accomplished by saws, chisels and gouges, or the like, at a considerable expenditure of time and with not entirely satisfactory results. It has been found that when using hand tools in treating a tree cavity, the bark frequently separates from the body of the tree at the cambium layer, due to the continual hammering on the gouges or chisels employed, and as a result the cavity is very slow to heal. By our method the work is quickly and conveniently done and without any injury to the tree. The apparatus required may be conveniently used in connection with an automobile truck which can be driven adjacent the tree and utilized as a source of power for compressing the air required. The use of compressed air is highly advantageous not only in providing an extremely flexible and convenient unit but also in providing a ready means for the disposal of the chips, and the like, which are formed in the tree cavity during cutting. With certain of the tools employed and hereinafter described, the exhaust air may be used to blow the chips out of the cavity and thus materially facilitate the work.

In the accompanying drawings:

Figure 1 is a perspective view, showing generally the present preferred manner of carrying out our invention;

Figure 2 is a side elevation of a tree to be treated;

Figure 3 is a view showing the first step in the treatment of the cavity;

Figure 4 is a side elevation of a tool used in the step shown in Figure 3;

Figure 5 is a view similar to Figure 3, showing the next step in the method as partly carried out;

Figure 6 is a side elevation of the tool employed in this step;

Figure 7 is a view similar to Figure 5, but showing the completed cavity;

Figure 8 is a side elevation of a tool which may be employed in waterproofing the interior of the cavity;

Figure 9 is a view showing the cavity of Figure 7 partially filled with cement;

Figure 10 is a horizontal section on the line X—X of Figure 9; and

Figure 11 is a top plan view of a motor truck which may be conveniently employed in connection with the invention.

Referring first to Figure 1, there is shown a motor truck 2 having an air compressor 3 mounted thereon and adapted to be driven by the engine 4. This compressor is shown in detail in our copending application Serial No. 703,098, filed March 31, 1924 now Patent 1,685,150. It is connected to a reservoir 5 by an air pipe 6. When the apparatus is in use the truck is driven alongside the tree or trees to be treated, the gear shift is placed in the neutral position, the compressor is connected to the engine and the engine is started. This delivers compressed air to the reservoir 5 from which it may be taken off as required by the various tools employed.

Reference will be made to Figures 2 to 10, inclusive, to show the several steps of the preferred method as carried out by us. Figure 2 shows a tree trunk having a cavity therein which it is desired to fill. It is first necessary to remove all the decayed wood and to cut back to sound wood so that the filled cavity will not further decay. The material to be excavated is first outlined on the outside of the tree as shown by dotted lines in Figure 2.

A boring tool 7, as shown in Figure 4, is employed for drilling a series of holes 8 which outline the cavity. Such holes, openings or recesses can, of course, be formed in other ways. A number of horizontal rows 9 of holes is also bored to facilitate removal of the wood. Air is supplied to the tool through a conduit 10 and is controlled at the tool by a valve trigger 11.

The next step in the operation is the removal of wood within the area indicated by the dotted line of Figure 2 and this is preferably accomplished by a rotary cutting tool 12 such as shown in Figure 6. This tool comprises an air turbine having cutting blades mounted on the periphery thereof to form a planer or chipping tool and it is specifically described and claimed in our copending application Serial No. 655,265, filed August 2, 1923. Patent No. 1,646,812. Air is supplied from the reservoir 5 through a conduit 13 and is controlled by a valve lever or trigger 14 on the handle. With this device the wood may be very rapidly removed and the cavity cut to final shape. With large cavities, both the tool and the motor will enter the cavity as they are manipulated by the operator through the handle. The tool operates at very high speed and removes the wood without separating the bark from the cambium layer as frequently occurs in hand chipping of cavities. Furthermore, the exhaust air from the tool may be utilized to blow the chips out of the cavity as they collect therein. This is clearly shown in the right hand portion of Figure 1.

The cavity when cut to final shape is shown in Figure 7, and this cavity after being disinfected is coated with a suitable waterproof paint. The paint is applied by a paint gun 15, shown in Figure 8, having an air line 16 and a paint line 17, both of which are flexible so that the tool may be readily operated. A trigger 18 controls both the paint and the air.

After the cavity has been painted it is ready for filling, and the filling is preferably in sections as disclosed in the patent to Wellington Davey No. 958,478, Figures 9 and 10 show the filling partially put in.

Various other operations may be readily carried out, as, for example, the trimming of tree branches by the trimming tool 19 shown in Figure 1. This device is specifically described and claimed in our copending application Serial No. 655,264, filed August 2, 1923, now Patent 1,682,268.

The entire apparatus may be conveniently embodied in a motor truck, as above stated, and this truck is shown in Figure 11 of the drawings. It will be seen that in addition to the apparatus before described, it comprises a reservoir 20 for the paint, this reservoir being provided with an air pipe 21 and a valve 22 for putting pressure on top of the paint, a concrete mixer 23 driven by an air motor 24, bins 25 for holding the concrete material, a locker 26 for carrying the various flexible conduits and air tools, and ladders 27 on the side of the vehicle. This truck provides a complete unit for the treatment of trees which may be driven adjacent a tree or trees to be treated. When the air compressor is started there is provided a source of power adjacent the work, and on this account mechanical power may be readily substituted for the hand work heretofore employed and the treatment of trees materially simplified. The cost of the work is greatly reduced, the quality of the fillings is improved and the entire job may be done far more conveniently and expeditiously than heretofore. In the claims involving the successive steps of cleaning a cavity, it will be understood that the order of the steps may be varied, so long as the holes are bored previous to roughing out the wood left adjacent the holes.

While we have illustrated a preferred embodiment of the invention, it will be understood that it is not thus limited, as it may be otherwise embodied within the scope of the following claims.

We claim:

1. A method of preparing cavities in trees comprising defining the proposed cavity by forming a series of openings of sufficient depth to protect the live wood outside the decayed area from fracture, and then removing the wood within the space so defined.

2. A method of preparing cavities in trees comprising defining the proposed cavity by boring a series of holes of sufficient depth to protect the live wood outside the decayed area from fracture, roughly removing the wood within the space so defined, and trimming the edges of the cavity adjacent the bark by removing in rapid succession thin layers of wood thus preventing injury to the cambium layers.

3. A method of preparing cavities in trees comprising defining the proposed cavity by boring a series of holes of sufficient depth to protect the live wood outside the decayed area from fracture, roughly removing the wood within the space so defined, trimming the edges of the cavity adjacent the bark by removing in rapid succession thin layers of wood thus preventing injury to the cambium layers, and smoothing the interior of the cavity by removing thin layers of wood in rapid succession.

4. A method of preparing cavities in trees comprising defining the proposed cavity by a series of openings of sufficient depth to protect the live wood outside the decayed area from fracture, forming rows of openings crosswise within the defined area, and then removing the wood within the area defined by said openings.

In testimony whereof we have hereunto set our hands.

JAMES ABRAM DAVEY.
PAUL H. DAVEY.
CHARLES L. GAUGLER.